[3,525,762]

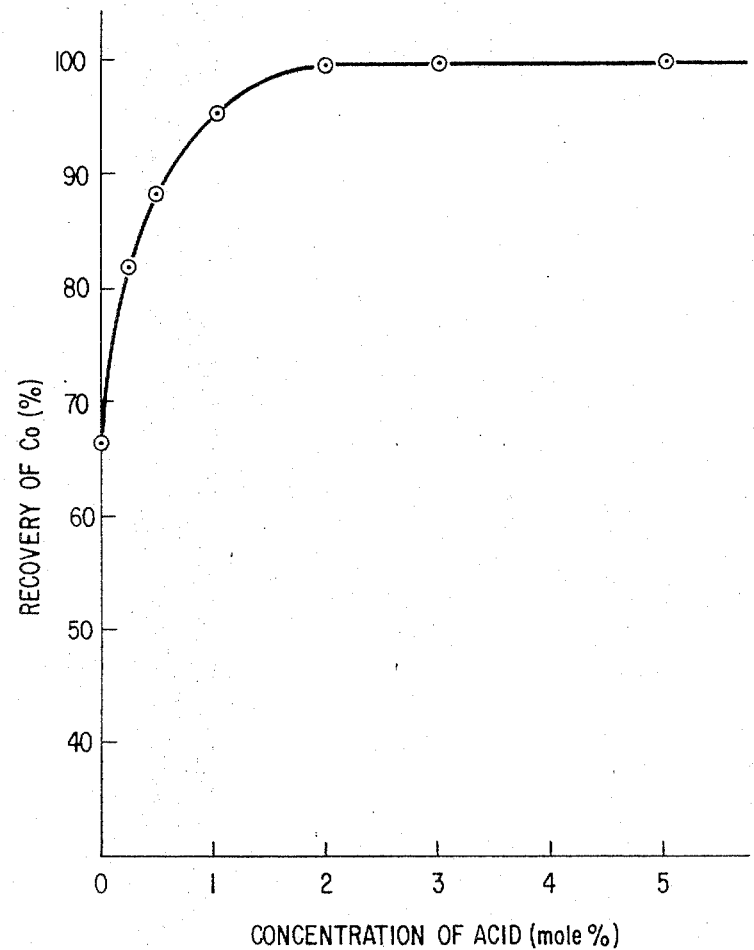

United States Patent Office

Patented Aug. 25, 1970

3,525,762
PURIFICATION AND RECOVERY OF COBALT-CONTAINING CATALYSTS

Yataro Ichikawa, Iwakuni-shi, Japan, assignor to Teijin Limited, Osaka, Japan, a corporation of Japan
Continuation-in-part of application Ser. No. 441,882, Mar. 22, 1965. This application Feb. 12, 1969, Ser. No. 798,591
Int. Cl. C07f *15/06;* C07c *63/02*
U.S. Cl. 260—439       9 Claims

ABSTRACT OF THE DISCLOSURE

A method of refining and recovering cobalt salt catalysts of lower aliphatic monocarboxylic acids of 2–4 carbon atoms, which comprises heating such cobalt salt catalysts at a temperature from 50–300° C. in the presence of an aqueous solution of a lower aliphatic monocarboxylic acid of 2–4 carbon atoms in which (a) not less than 2 moles of the aliphatic monocarboxylic acid, and not less than 4 moles of water, per gram-atom of the cobalt are present, and
(b) the concentration of the aliphatic monocarboxylic acid in the total aqueous solution present in the system being from not less than 0.2 mole percent to not more than 80 mole percent, Such cobalt salt catalyst is one used for the oxidation of hydrocarbons or their oxidation derivatives with molecular oxygen, the used catalyst being in the form of a trivalent form of the cobalt salt.

---

This application is a continuation-in-part application of co-pending application Ser. No. 441,882 filed Mar. 22, 1965, now abandoned.

The present invention relates to a method of recovery of the cobalt-containing catalysts used in liquid phase oxidation processes. More particularly, the invention relates to a method of purification and recovery of the trivalent catalysts used in the production of oxidation products by oxidizing hydrocarbons and/or their oxidized derivatives with molecular oxygen, in the presence of cobalt salts of lower aliphatic monocarboxylic acids of 2–4 carbons as catalysts.

Recent developments in petroleum chemical industries afford rich supplies of aliphatic, alicyclic and aromatic hydrocarbons, and as the result, liquid phase oxidation of these hydrocarbons or their oxidized derivatives using molecular oxygen, such as air, to form ketones, alcohols and carboxylic acids, etc. has become to be the object of industrial concern and has been widely practiced.

A typical process includes, for example, the production of acetic acid from acetaldehyde, of benzoic acid from toluene, of cyclohexanol and cyclohexanone from cyclohexane, of adipic acid from these products, and of terephthalic acid from p-xylene.

Such liquid phase oxidation processes using molecular oxygen are normally practiced in the presence of catalysts. As such catalysts, salts of valency-variable metals such as cobalt and manganese are preferred, particularly cobalt salts of lower aliphatic monocarboxylic acids of 2–4 carbons. The cobalt salt catalysts of lower aliphatic monocarboxylic acids of 2–4 carbons are used with particularly satisfactory results in oxidation of hydrocarbons and/or their oxidized derivatives in a solvent comprising a lower aliphatic monocarboxylic acid of 2–4 carbons or an aqueous solution thereof of no more than 30 mole percent of water content.

In the liquid phase, particularly in the liquid phase using an aliphatic monocarboxylic acid of 2–4 carbon atoms or its aqueous solution (of which water content is no more than 30 mole percent) as the solvent, when a hydrocarbon or its oxidized derivative is oxidized with molecular oxygen in the presence of the said cobalt salt of an aliphatic monocarboxylic acid of 2–4 carbons as catalyst, the reaction mixture, after the completion of the reaction, comprises the object product, the liquid medium used, the side-produced water from the oxidation reaction, the catalysts used, unoxidized material, intermediate oxidation products and other side products of the oxidation. Some of the above, particularly the side products of the oxidation, contain certain substances having oxidation-restricting or inhibiting actions. Therefore, when the object product, or that and the side-produced water are removed from the reaction mixture and the remaining mother liquor is recycled as for further oxidation of hydrocarbons or their oxidized derivatives, the catalytic activity of the catalyst (a cobalt salt of an aliphatic monocarboxylic acid of 2–4 carbons) is lowered as the number of times of the recirculation increases, and the purity of the object product is also lowered as impurities tend to be mixed therein. Therefore, for liquid phase air-oxidation using a liquid media, effective treatment of the mother liquor containing the catalyst, remaining after the removal of the object oxidized product from the reaction mixture, is of industrial importance.

As one of such treatments, it is known in the production of terephthalic acid by oxidation of p-xylene with molecular oxygen in the presence of bromine and a cobalt salt, that the mother liquor remaining after the removal of crude terephthalic acid from the reaction mixture may be oxidized with nitric acid, so that the intermediate oxidation products and unreacted p-xylene in the liquor may further be converted into terephthalic acid, and the cobalt salt in the liquor may be converted into cobalt nitrate to be recovered. However, while such a process allows the recovery of the unreacted material and the intermediate oxidation products as terephthalic acid, it suffers the disadvantage that the catalyst cannot be directly recycled and re-used because it is recovered in the form of cobalt nitrate. Again, since in such a process nitric acid oxidation is practiced in the presence of a bromine-containing compound, the equipment is heavily corroded, which is industrially very objectionable.

On the other hand, it was recently proposed to obtain aromatic carboxylic acids, particularly terephthalic acid, with good yields under relatively mild conditions at lower reaction temperatures, using cobalt-containing catalysts, together with other additives such as methylenic ketones, ozone and aldehydes. However, no advantageous means of recovery of the cobalt-containing catalyst has yet been found with respect to that process.

An exemplary process for the recovery of oxidation catalysts is such as illustrated, for example, in U.S. Pat. 2,964,559 to Burney et al. The process shown in this patent is one involving the recovery of a heavy metal oxidation catalyst used in an oxidation process carried out with the use of bromine as a promoter. In accordance with such an oxidation method, the oxidation is ordinarily carried out at a temperature above 150° C. and the used cobalt catalyst is present in the reaction mixture in a divalent form. Thus, in accordance with the process disclosed in this patent it is indicated that the distillation bottoms from the reaction mixture can be extracted with water or glacial acetic acid to provide for the recovery of the heavy metal catalyst. As indicated previously, however, such a process as described in U.S. Pat. 2,964,559 is disadvantageous in view of the use of the bromine promoter which complicates the system and provides distinct disadvantages with respect to the type of apparatus which can be utilized due to the corrosive nature of the promoter.

The environment of the development of the process of the present invention differs from that illustrated, for example, in U.S. Pat. 2,964,559 in that the oxidation process employing a cobalt salt catalyst is not conducted in the presence of bromine or a bromine-type promoter, and, accordingly, the reaction mixture is not the same as that obtained in accordanc with the previously described process. Thus, in accordance with the environment in which the process of the present invention was developed the cobalt salt catalysts to be recovered in accordance with the process of the present invention are primarily or substantially in the trivalent form.

Until the development of the present invention no satisfactory process had yet been developed for recovering such trivalent form of the cobalt salt catalysts from an oxidation process conducted in the absence of bromine or a bromine-type promoter. In accordance with the present invention, however, such a satisfactory process has been developed whereby the cobalt salt catalysts resulting from such oxidation process is heated to a temperature within the range of 50–300° C. in the presence of an aqueous solution of a lower aliphatic monocarboxylic acid of 2–4 carbon atoms wherein the aliphatic monocarboxylic acid and water are present in at least certain amounts per gram-atom of the cobalt metal present and the aliphatic monocarboxylic acid is present in the aqueous solution in a mole percent of at least 0.2 to a mole percent of not less than 80.

It is, therefore, a principal object of the process of the present invention to provide a system for the purification of the cobalt salt catalyst of an oxidation process in a manner which eliminates the inherent deficiencies of previously employed processes.

It is a further object of the present invention to provide a process for removing, from the mother liquor of the reaction mixture of the above-described liquid phase oxidation with molecular oxygen, such side products which prevent the oxidation reaction or lower the purity of the product, as well as for recovering therefrom the cobalt-containing catalyst used, in the form suited for direct re-use.

A still further object of the present invention is to provide a method for the recovery of the cobalt salt catalyst in the trivalent form by a process which comprises contacting said cobalt salt catalyst at a temperature of from 50–300° C. in the presence of an aqueous solution of a lower aliphatic monocarboxylic acid having from 2–4 carbon atoms.

Still further objects of the novel process of the present invention will become more apparent from the following more detailed description of the present invention.

The single figure represents a graph of the relationship between the concentration of acid in mole percent and the recovery of the cobalt catalyst in accordance with the present invention.

According to the present invention, the cobalt salt catalysts of lower aliphatic monocarboxylic acids of 2–4 carbons, contained in the mother liquor of the reaction mixture of the oxidation of hydrocarbons or their oxidized derivatives, can be recovered in purified form by heating the same to a temperature ranging from 50–300° C. in the presence of an aqueous solution of a lower aliphatic monocarboxylic acid of 2–4 carbons, in which (a) no less than 2 moles of the aliphatic monocarboxylic acid, and no less than 4 moles of water, per gram-atom of the cobalt are present, and (b) the concentration of the aliphatic monocarboxylic acid in the total aqueous solution present in the system is no less than 0.2 mole percent and no more than 80 mole percent, and separating the solid therefrom after cooling.

It has been discovered that when hydrocarbons and/or their oxidized derivatives are oxidized in liquid phase with molecular oxygen in the presence of a cobalt salt of an aliphatic monocarboxylic acid of 2–4 carbons as the catalyst, besides the object oxidation product and the intermediate oxidation products, complicated side products are formed. It is presumed that these side products contain the substances which prevent the oxidation reaction. For example, oxidation products of phenolic substances side-produced during the oxidation of p-xylene are such objectionable side products. Therefore, if the catalyst system containing these side products is recycled and continuously used for the oxidation reaction without any refining treatment, as the number of recycles increase, its catalytic activity is lowered, which also causes lowering of the purity of the product. These objectionable side products cannot be easily separated and removed from the mother liquor of the reaction mixture from which the object oxidation product has been removed, since they are soluble in the mother liquor. This is probably because the objectionable substances form certain types of chelate bonds with the metal cobalt.

However, when in accordance with this invention a suitable amount of water is added to the mother liquor to form an aqueous solution in which (a) no less than 2 moles of the aliphatic monocarboxylic acid, and no less than 4 moles of water, per gram-atom of cobalt are present, and (b) the concentration of the aliphatic monocarboxylic acid in the total aqueous solution present in the system is no less than 0.2 mole percent, preferably 0.5 mole percent and no more than 80 mole percent, preferably no more than 60 mole percent, and the aqueous solution is heated to 50–300° C. followed by cooling, a solid precipitate is formed. When the solid is removed, the remaining liquor is apparently free from the oxidation reaction-preventing substances. As the liquor comprises the cobalt salt of the aliphatic monocarboxylic acid of 2–4 carbons dissolved in the said aqueous solution of the monocarboxylic acid, it may be recycled, as it is or after being subjected to distillation to have some of the water content removed. According to this invention, if necessary, the mother liquor treated as in the above from which the solid precipitate has been removed may be subjected to further treatments such as distillation or drying so that the cobalt salt of the aliphatic monocarboxylic acid of 2–4 carbons may be recovered in the form of a concentrated solution isolated solid, which can be re-used as the catalyst.

Again, as aforesaid, in the oxidation of hydrocarbons and/or their oxidized derivatives using cobalt salt catalysts of aliphatic monocarboxylic acids of 2–4 carbons with which this invention concerns, it is preferred to use an aliphatic monocarboxylic acid of 2–4 carbons as the solvent. When the oxidation is performed in the presence of the preferred solvent, therefore, the mother liquor obtained after removing the object oxidation product from the reaction mixture consists of an aqueous solution of an aliphatic monocarboxylic acid in which the used catalyst in a substantially trivalent state and the side products of the reaction are dissolved or partially suspended. In addition, the mother liquor would presumably contain unreacted hydrocarbon and intermediate oxidation products. Thus according to the present invention, when after the oxidation reaction the mother liquor is obtained in such a state wherein the used catalyst is contained in an aqueous solution of an aliphatic monocarboxylic acid of 2–4 carbons, it is sufficient to add a suitable amount of water to the mother liquor to control the monocarboxylic acid content and the water content in the system to meet the afore-described conditions (a) and (b) and thereafter to heat and cool the solution and remove the precipitated solid.

According to this invention, it is not necessarily true that the whole mother liquor remaining after the removal of the object oxidation product from the oxidation reaction mixture must be treated as proposed, but only suitable amounts of the mother liquor may be treated after a suitable number of recycles.

The treating solvent of this invention should meet the afore-described conditions (a) and (b) because if the aliphatic monocarboxylic acid is less than 2 moles and water less than 4 moles per gram-atom of cobalt, recovery of the cobalt and the removal of the side products become unsatisfactory. Whereas, if the concentration of the monocarboxylic acid in the total of the aqueous solution is more than 80 mole percent, the separation of the side products again becomes incomplete and the recovery ratio of the cobalt is lowered. For this reason, it is preferred to control the monocarboxylic acid content in the solvent to be no less than 3 moles per gram-atom of cobalt, and particularly no more than 60 mole percent of the total aqueous solution.

Similarly, as will be shown hereinafter with respect to the specific examples and controls the use of water alone in the process of the present invention does not adequately effect the necessary purification of the used cobalt catalyst. Accordingly, the aliphatic monocarboxylic acid must be present in at least a minimum concentration of 0.2 mole percent based upon the aqueous solution in order to achieve the advantageous results associated with the instant process. In this regard, use of less than this amount as will be shown hereinafter will not advantageously provide the necessary and desired purification.

The treating temperature should be 50–300° C. according to this invention, a temperature of 100–200° C. being particularly preferred. This is because, at a treating temperature lower than 50° C., the treating time is impractically lengthened, while at above 300° C., the reaction pressure becomes excessively great to present operational difficulty. The treating time should be sufficient to cause the substantial precipitation of the solid while the heated solution is cooled, which time may range from several minutes to several hours depending on the specific temperature employed.

The treating pressure suited for this invention is from atmospheric to 300 atmospheres, preferably from atmospheric to 100 atmospheres.

The treatment of this invention may also be given to reaction mixture of the oxidation from which the object product carboxylic acid has not been removed or only partially removed. However, generally it is preferred to perform the treatment subsequent to the removal of the carboxylic acid.

Any known means may be employed for the separation of the product carboxylic acid. In case the product is solid, e.g., terephthalic acid, mechanical means of separation, i.e., filtration and centrifugal separation, such as centrifugal filtration and centrifugal precipitation, are advantageous.

The liquid treated in accordance with this invention consists of solid and liquid phases, which can generally advantageously be separated into two phases by known mechanical means, i.e., filtration and centrifugal separation, such as centrifugal filtration and centrifugal precipitation. The separated liquid phase contains the purified cobalt-containing catalyst, which may be recycled to the oxidation zone as it is, or first condensed and then recycled as a catalytic liquid. The liquid may also be condensed and dried to separate the solid catalyst which can be re-used. Again the cobalt in the liquid phase may be separated and refined by such means as ion-exchange resins, so that the objectionable metallic components mixed thereinto due to, for example, corrosion of the reaction vessel, such as iron and copper, may be removed therefrom.

The residue remaining after the separation of the liquid phase consists mainly of carboxylic acid, intermediate oxidation products and other side products of the oxidation. The carboxylic acid can be separated from the intermediate oxidation products and other side products and recovered, by subjecting the residue as it is or after drying to such means as extraction with a suitable solvent, e.g., water, acetic acid or a mixture thereof, or recrystallization. It is also possible, when distillation is applicable, to recover the carboxylic acid from the residue by means of distillation. Similarly, the residue may be subjected to a suitable method of oxidation, for example, nitric acid oxidation, so that it may be substantially converted to the carboxylic acid to be recovered.

The hydrocarbons and/or oxidized derivatives thereof to be oxidized which are contemplated in this invention may be any which can be converted into carboxylic acids by means of liquid phase oxidation with molecular oxygen. Among such, those which produce carboxylic acids which are insoluble in the solvent used and obtained as precipitates are particularly preferred. Such preferred compounds include, inter alia, toluene, m-xylene, p-xylene, p-cymene, cyclohexane, p-tolualdehyde, m-tolualdehyde, p-toluic acid, m-toluic acid, methyl p-toluylate, methyl m-toluylate, cyclohexanol and cyclohexanone.

Again, the liquid phase oxidation with molecular oxygen with which this invention concerns may be performed in any manner under any condition as long as it is done in the presence of a cobalt salt catalyst of an aliphatic monocarboxylic acid of 2–4 carbons and in the absence of bromine or bromine-type promoter. This invention is particularly suitable for the recovery of the catalyst used in the oxidation reactions in which aliphatic monocarboxylic acids of 2–4 carbons are used as the solvent. Examples of such oxidation reactions would be: that which is performed in the presence of a relatively large amount of cobalt as previously proposed; that performed in the presence of a methylenic ketone such as methyl ethyl ketone and cobalt-containing catalyst, or in the presence of propionic acid and cobalt; that using ozone as the initiator and cobalt-containing catalyst; and that performed in the presence of an aliphatic aldehyde and cobalt-containing catalyst.

The "aliphatic monocarboxylic acids of 2–4 carbons" include, for example, acetic, propionic, n- and iso-butyric acids, acetic acid being particularly preferred.

For a clearer understanding, the following specific examples are given.

EXAMPLES 1–8

A stainless steel pressure reactor having a gas inlet in the lower part and a stirrer was charged with 20 parts of p-xylene, 130 parts of acetic acid and 20 parts of cobalt acetate ($Co(OOCCH_3)_2 \cdot 4H_2O$), and while its inside temperature was maintained at 120° C., air was blown thereinto at the rate of 0.095 mol/mol of p-xylene charged/min. in terms of oxygen at a pressure of 20 kg./cm.$^2$ G while the stirrer was rotated at 1200 r.p.m. The reaction was continued until substantially no absorption of oxygen was observed, and thereafter the reaction mixture was taken out of the reactor, the reaction mixture being subsequently separated into solid phase and liquid phase (mother liquor) by a centrifuge. The solid was washed with a small amount of glacial acetic acid. The washing liquid was combined with the above mother liquor and distilled to have water and acetic acid removed. About ⅗ of the amount of the mother liquor of black liquid remained after the distillation. Five parts thereof was taken as the sample, to which water was added each in the amount specified in Table 1 below, and the mixture was heated under the conditions also specified in Table 1 below. The originally dark green liquid gradually turned dark purple and then reddish purple which, when cooled, was separated into white precipitate (residue) and reddish purple mother liquor. The system was filtered and the precipitate was washed with water followed by a drying at 120–130° C. The filtrate and the washing water were combined and concentrated to yield a cobaltous acetate solution. This cobaltous acetate solution can be reused as an oxidation catalyst of hydrocarbons such as p-xylene as it is or after having a predetermined amount of water removed by distillation.

In Table 1 below, the cobaltous acetate content of each of the concentrated cobaltous acetate solutions was determined by quantitative analysis.

Further in the same table, besides Examples 1–8, an embodiment in which the temperature condition at the time of recovery was below the range specified in this invention is given as Control 1. From Control 1, it can be understood that when the temperature at the time of recovery is lower than the specified range, the recovery ratio of cobaltous acetate drops abruptly.

in the liquid in terms of molar ratio, the recovery of cobalt was unsatisfactory.

EXAMPLE 9

A stainless steel pressure reactor having a gas inlet in the lower part and a stirrer was charged with 20 parts of p-xylene, 130 parts of acetic acid, 4.72 parts of cobalt acetate $(Co(OAc)_2 \cdot 4H_2O)$ and 13.6 parts of methyl ethyl ketone. While the inside temperature of the reactor was maintained at 120° C. and the stirrer was rotated at 1200 r.p.m., at a pressure of 20 kg./cm.$^2$ G, air was passed through the reactor at the rate of 0.1 mole/mole of p-xylene/min. in terms of oxygen. The reaction was continued until substantially no absorption of oxygen became observable, and thereafter the reaction mixture was taken out, and separated into solid phase and liquid phase (mother liquor) by means of a centrifuge. The solid was washed with a small amount of glacial acetic acid, and the washing liquid was combined with the mother liquor. The mixture was heated, after addition thereto of the equal weight amount of water, to 130–140° C. at a pressure of about 5 kg./cm.$^2$ G for 30 minutes and cooled to yield a white precipitate and a reddish purple mother liquor.

TABLE 1

| Example No. | Amount of sample liquid remained after distillation (part) | Amount of water added (part) | Mole $H_2O$/gram-atom Co | Mole $A_cOH$/gram-atom Co | $A_cOH$ (mol percent) | Temp., (°C.) | Time | Co recovery ratio (percent) | Amount of residue (part) |
|---|---|---|---|---|---|---|---|---|---|
| 1 | 5 | 15 | $2.3 \times 10^2$ | $1.56 \times 10^2$ | 46.5 | 110–120 | 3 hours | 97.51 | 0.0415 |
| 2 | 5 | 15 | $2.3 \times 10^2$ | $1.56 \times 10^2$ | 46.5 | 150 | do | 94.63 | 0.044 |
| 3 | 5 | 7.5 | $1.18 \times 10$ | $1.56 \times 10^2$ | 62.8 | 150 | do | 97.06 | 0.0383 |
| 4 | 5 | 7.5 | $1.18 \times 10$ | $1.56 \times 10^2$ | 62.8 | 120–140 | 20 min | 99.81 | 0.0174 |
| 5 | 5 | 5 | $8.1 \times 10^2$ | $1.56 \times 10^2$ | 71.0 | 120–140 | do | 98.82 | 0.0156 |
| 6 | 5 | 10 | $1.555 \times 10^2$ | $1.56 \times 10^2$ | 56.0 | 200 | do | 98.11 | 0.0203 |
| 7 | 5 | 10 | $1.555 \times 10^2$ | $1.56 \times 10^3$ | 56.0 | 250 | do | 99.07 | 0.0217 |
| 8 | 5 | 20 | $5.36 \times 10^2$ | $1.56 \times 10^2$ | 39.4 | 80 | do | 81.12 | 0.0771 |
| Control 1 | 5 | 20 | $5.36 \times 10^2$ | $1.56 \times 10^2$ | 39.4 | 48 | do | 66.98 | 0.0819 |

Below, Controls 2–5 are given, all of which were practiced under conditions outside those specified in this invention.

Control 2

The liquid remaining after distillation obtained in the same manner as in Example 1 was distilled and dried, and to the solid residue an aqueous solution of acetic acid (acetic acid 85 mole percent) was added at the ratio of 10 parts of the latter per 1 part of the former. The mixture was heated to 120–140° C. continuously for 20 hours, but neither the color change nor the separation of residue was observed, and the recovery of cobaltous acetate could not be performed.

Control 3

To one part of the dry solid remaining after the distillation as in Control 2, 10 parts of water were added without any addition of a lower aliphatic monocarboxylic acid, and the system was heated to 120–140° C. continuously for 20 hours. No substantial separation of the residue from the cobalt-containing catalyst took place, and the recovery of cobaltous acetate could not be performed.

Control 4

In a further example the liquid remaining after the distillation as in Example 1 was treated as in Control 1 in an aqueous solution of acetic acid (acetic acid 40 mole percent) containing 1.5 moles of acetic acid per the cobalt present in the liquid in terms of molar ratio. The recovery ratio of cobaltous acetate was 44%, and in the residue a part of the cobalt remained unrecovered.

Control 5

In a case wherein the liquid remaining after the distillation as in Example 1 was treated as in Control 1 in an aqueous solution of acetic acid (acetic acid 60 mole percent) containing 0.4 mole of water per the cobalt present The system was filtered, and the precipitate was washed with water and dried at 110° C. to yield 0.52 part of residue. From the washing water and the filtrate, cobaltous acetate was recovered at the recovery ratio of 98.97%. The residue was heated with 10 parts of acetic acid to 260° C., cooled and recrystallized to yield 0.33 part of terephthalic acid.

EXAMPLE 10

The acetic acid of Example 1 was replaced by propionic acid, and the treatments as in Example 9 were repeated. Cobaltous propionate was recovered at the recovery ratio of 96.2%, and 0.48 part of residue were obtained. This residue was charged in an autoclave together with 60% nitric acid, heated to 190° C. for an hour, cooled, and filtered to yield 0.35 part of terephthalic acid.

EXAMPLE 11

The same starting materials used in Example 1 were charged in the reactor at the same ratio, and p-xylene was oxidized first with ozone for 30 minutes and then with air. The reaction mixture was treated as in Example 9, and cobaltous acetate was recovered at the recovery ratio of 97.9%. The 0.44 part of residue obtained were heated to 250° C. with 10 parts of acetic acid, cooled and recrystallized to yield 0.29 part of terephthalic acid.

EXAMPLE 12

Example 9 was repeated except in place of methyl ethyl ketone, 30 parts of acetaldehyde were used, and the reaction temperature was 50–60° C. for the initial two hours and thereafter raised to 115° C. The reaction mixture was treated as in Example 9, and cobaltous acetate was recovered at the recovery ratio of 99.1%. The 1.28 parts of the residue obtained were subjected to a nitric acid oxidation as in Example 10, to yield 1.10 parts of terephthalic acid.

EXAMPLE 13

20 parts of each of the following compound or compounds to be oxidized, 130 parts of acetic acid and 5 parts of cobalt acetate $(Co(OAc)_2 \cdot 4H_2O)$ were treated as in Example 1 under the below-specified conditions. Each resultant liquid remaining after distillation was heated to 120–140° C. for 30 minutes at an elevated pressure together with equal parts of water by weight and showed the same color changes as observed in Example 1, and when cooled, was separated into white precipitate and reddish purple mother liquor. The system was filtered, and from the filtrate, cobalt acetate was recovered at the recovery ratios as follows:

| Material to be oxidized | Product | Temp. (° C.) | Recovery ratio of cobalt percent |
|---|---|---|---|
| Toluene | Benzoic acid | 120 | 96.7 |
| Cyclohexanone+ cyclohexanol (1:1). | Adipic acid | 85 | 95.1 |
| m-Xylene | Isophthalic acid | 120 | 94.3 |
| p-Tolualdehyde | Terephthalic acid | 100 | 96.1 |

EXAMPLE 14

The acetic acid of Example 1 was replaced by butyric acid, and the treatments as in Example 9 were repeated. Cobaltous butyrate was recovered at the recovery ratio of 95.7%, and 0.36 part of residue were obtained. This residue was charged in an autoclave with 60% nitric acid, heated to 190° C. for an hour, cooled and filtered to yield 0.30 part of terephthalic acid.

EXAMPLE 15

To 1 part of dry solid obtained by further distillation of the sample liquid of Example 1, an aqueous solution of acetic acid (60% AcOH) containing 4 moles water per gram-mole of cobalt present in the dry solid were added, and the system was heated to 200° C. for an hour and cooled. Cobaltous acetate was obtained at the recovery ratio of 91.07%, and 0.043 part of residue were obtained.

EXAMPLE 16

To 1 part of dry solid obtained by further distillation of the sample liquid of Example 1, an aqueous solution of acetic acid (10 mole percent AcOH) containing 2.5 moles of acetic acid per gram-mole of the cobalt present in the dry solid were added. The system was heated to 150° C. for an hour, and cooled. Cobaltous acetate was obtained at the recovery ratio of 97.65%, and 0.0487 part of residue were obtained.

EXAMPLE 17

To 1 part of the sample liquid of Example 1, 4.24 parts of water were added. The AcOH mole percent in the system was 80%. The system was heated to 150° C. for an hour and cooled to yield a cobaltous acetate solution. The cobalt recovery ratio from this solution was 96.51%, and the residue obtained at that time was 0.0137 part.

EXAMPLES 18–20

Controls 6–13

The following examples were conducted in order to illustrate the unexpected improvement of the process of the present invention as compared, for example, with the process as described in U.S. Pat. 2,964,559.

A 500 cc. titanium-made electromagnetic stirring type autoclave was charged with 40 g. of p-xylene, 40 g. of cobalt acetate and 260 g. of acetic acid, and the oxidation was conducted for 26 hours at 120° C. and 20 kg./cm.$^2$ G with an amount of air flow of 200 cc./min. The obtained reaction mixture was filtered at room temperature, washed with 200 cc. of acetic acid by heating, and then again filtered. The separated solid terephthalic acid was heated under reflux for about 1 hour with a 2 N hydrochloric acid, and then filtered. After drying, there was obtained crude terephthalic acid.

Meanwhile, the oxidized filtrate was combined with the washed filtrate. In a water bath of 50 to 60° C., the volatile matter was removed by distillation under reduced pressure. There was obtained 35.5 g. of a residue (A). The residue was pulverized. 4.89 g. of the pulverized residue was charged into a flask, and immersed into an oil bath at 200 to 220° C. While maintaining the pressure at 40 mm. Hg, high boiling organic matters were removed by effecting the distillation for 4.5 hours to get 4.08 g. of a concentrate. Glacial acetic acid and the so obtained concentrate of predetermined amounts were charged into a test tube, and shaken vigorously. The test tube was immersed for 40 minutes in a vessel constantly maintained at 75° C. During the reaction, the test tube was shaken vigorously from time to time. After the reaction, the reaction mixture was cooled down to room temperature, and filtered with a glass filter. Then, the analysis of cobalt in the filtrate was conducted. The cake was dried under reduced pressure. The results about the recovery ratios of cobalt obtained by the above-mentioned analysis are shown in Table 2 (Experiments 18 to 22).

In accordance with the procedure outlined in U.S. Pat. 2,964,559 the following controls were run.

A 500 cc. titanium-made electromagnetic stirring type autoclave was charged with 75 g. of p-xylene, 150 g. of acetic acid, 0.2 g. of cobalt acetate tetrahydrate, 0.4 g. of manganese acetate and 0.2 g. of ammonium bromide, and the reaction was conducted at 210° C. and 30 kg./cm.$^2$ G with an amount of air flow of 2 liters/min. until there was substantially no absorption of oxygen. The time required for the reaction was about 3.5 hours. The so obtained reaction mixture was suction-filtered at room temperature. The cake was washed with hot acetic acid, and filtered. This washing was repeated two times, and the cake was dried under reduced pressure to form 99.9 g. of crude terephthalic acid. The purity was 97.8%, and therefore, the yield of terephthalic acid was 83.2%.

Meanwhile, the reaction filtrate was combined with the washed filtrate, and they were distilled in a water bath at 50° C. under a pressure of 20–30 mm. Hg abs. to form 11.0 g. of a brown residue (B). The so obtained residue, water, and acetic acid of predetermined amounts were charged into a test tube, and shaken vigorously. The test tube was immersed for 40 minutes in a vessel constantly maintained at 75° C. During the reaction, the test tube was shaken vigorously from time to time. After the reaction, the reaction mixture was cooled down to room temperature, and filtered with a glass filter. Then, the analysis of cobalt and manganese in the filtrate was conducted. The cake was dried under reduced pressure.

The results about the recovery of cobalt and manganese obtained by the above-mentioned analysis are shown in Table 2 (Controls 6–8).

On the other hand, 3.61 g. of the residue (B) obtained above was charged into a flask, and immersed in a warm bath at 200 to 220° C. While maintaining the pressure at 40 mm. Hg abs., high boiling organic matters were removed by conducting the distillation for 3.5 hours to get 2.63 g. of residue (C). The residue was taken out, and pulverized. Then, the recovery of the catalyst was effected in the same manner as mentioned above. The results are shown in Table 2 (Controls 9–11).

TABLE 2

| No. | Residue (gr.) | Water added (gr.) | Acetic acid added (gr.) | Concentration of acetic acid (mole percent) | Temperature (°C.) | Time (min.) | Ratio of recovery of cobalt (percent) |
| --- | --- | --- | --- | --- | --- | --- | --- |
| Control 6 | 0.356 | 10.0 | 0 | 0 | 75 | 40 | 69.7 |
| Example 18 | 0.763 | 2.545 | 14.5 | 5 | 75 | 40 | 98.8 |
| Example 19 | 0.753 | 5.527 | 14.9 | 10 | 75 | 40 | 97.9 |
| Example 20 | 0.393 | 9.789 | 2.94 | 50 | 75 | 40 | 97.9 |
| Control 7 | 0.857 | 0 | 17.0 | 100 | 75 | 40 | 27.3 |
| Control 8 | 0.839 | 0 | 5.0 | 0 | 75 | 40 | 59.9 |
| Control 9 | 0.777 | 4.833 | 1.45 | 50 | 75 | 40 | 59.3 |
| Control 10 | 0.789 | 5.324 | 0 | 100 | 75 | 40 | 45.5 |
| Control 11 | 0.858 | 0 | 5.0 | 0 | 75 | 40 | 62.6 |
| Control 12 | 0.773 | 4.819 | 1.45 | 50 | 75 | 40 | 51.1 |
| Control 13 | 0.720 | 5.131 | 0 | 100 | 75 | 40 | 55.1 |

The residue in the above table means residue (A) for Examples 18–20 and Controls 6 and 7, residue (B) for Controls 8–10, and residue (C) for Controls 11–13.

It can be seen from a comparison of Controls 6 and 7 with Examples 18 through 20 that where water alone or acetic acid alone is employed in the purification process recovery of the cobalt catalysts cannot be obtained as in accordance with the present invention. Thus, in Control 6 wherein only water was employed in the purification process the ratio of recovery of cobalt was only 69.7% as compared to recoveries of greater than 97% in accordance with Examples 18 through 20. Moreover, in accordance with Control 7 where only acetic acid was employed in the recovery or purification process the ratio of recovery of cobalt was only a very low 27.3%.

It can be seen with regard to Controls 8 through 13, i.e., those controls conducted in accordance with U.S. Pat. 2,964,559, that the recovery ratio of the cobalt catalysts is essentially the same regardless of the amounts or concentration of the water or acetic acid employed in the purification process. Additionally, it can be seen from a review of Controls 8 through 13 that the ratio of recovery of cobalt in accordance with U.S. Pat. 2,964,559 is low, ranging from 45.5 to 62.6%.

It is hypothesized that this low degree of recovery of the cobalt catalysts is due to the fact that the process of U.S. Pat. 2,964,559 employs a bromine promoter which converts the cobalt catalyst to a bivalent form, rather than the trivalent form employed and recovered in accordance with the process of the present invention. Additionally, since the oxidation process of U.S. Pat. 2,964,559 is conducted in the presence of bromine at a varily elevated temperature, the oxidation process contains many tar-like residues which also attribute to the low recovery rate of the cobalt catalysts.

EXAMPLE 21

The following example is presented to illustrate the relationship of the lower monocarboxylic acid concentration to the recovery ratio of the cobalt catalysts.

Residue (A) obtained in Examples 18–20 was pulverized. A predetermined amount of the pulverized residue (A) was sampled, and predetermined amounts of acetic acid and water were added for a predetermined period of time. The reaciton mixture was cooled to room temperature, and filtered to obtain a cake and a filtrate. The filtrate was analyzed and the results are shown in Table 3.

that an abrupt increase in the amount of cobalt recovered is obtained when the mole concentration of the acid is increased.

It can be seen from the results of this experiment and as illustrated in the figure that when the concentration of the lower monocarboxylic acid in the solvent is less than about 0.5%, particularly less than about 0.2%, the ratio of the cobalt is lowered abruptly. Accordingly, it can be seen that the concentration of the acid in the solvent greatly influences the ratio of recovery of cobalt when the cobalt catalyst is recovered from an oxidation reaction mixture obtained according to the present invention in which a bromine promoter is not employed. Thus, in accordance with the present invention it is only when the parameters previously specified are met that the advantageous recovery of the cobalt catalysts in the high yields indicated can be obtained.

What is claimed is:

1. A method of refining and recovering a cobalt salt catalyst of lower aliphatic monocarboxylic acids of 2–4 carbon atoms used for the oxidation of hydrocarbons or their oxidized derivatives with molecular oxygen, said oxidation being carried out in the presence of a trivalent form of said cobalt salt in the absence of bromine, which comprises heating said used cobalt salt catalyst to a temperature ranging from 50 to 300° C. in the presence of an aqueous solution of a lower aliphatic monocarboxylic acid of 2–4 carbon atoms in which (a) not less than 2 moles of the aliphatic monocarboxylic acid, and not less than 4 moles of water, per gram-atom of the cobalt are present, and (b) the concentration of the aliphatic monocarboxylic acid in the total aqueous solution present in the system is not less than 0.2 mole percent and not more than 80 mole percent, cooling the system and removing therefrom the solid component.

2. The method according to claim 1 wherein said aqueous solution of a lower aliphatic monocarboxylic acid of 2–4 carbon atoms is produced by adding water to the mother liquor remaining after removal of the oxidation product from said oxidation of hydrocarbons of their oxidized derivatives.

3. The method according to claim 2, in which the

TABLE 3

| Example No. | Amount charged (gr.) | | | Concentration at the time of charging | | | Temp. (°C.) | Time (hr.) | Ratio of recovery of cobalt (percent) | Amount of residue, residue (gr.)/ charge (gr.) |
| --- | --- | --- | --- | --- | --- | --- | --- | --- | --- | --- |
| | Concentrated residue | Acetic acid | Water | H₂O/Co mole | AcOH/Co mole | AcOH mole percent | | | | |
| 21(a) | 0.3015 | 0 | 20.00 | 796 | 0 | 0 | 73–75 | 13 | 66.4 | 0.22 |
| 21(b) | 0.9190 | 0.5461 | 15.30 | 200 | 2.1 | 1.06 | 73–75 | 5 | 95.5 | 0.11 |
| 21(c) | 0.8581 | 2.4768 | 14.29 | 200 | 10.4 | 4.95 | 73–75 | 5 | 99.8 | 0.081 |
| 21(d) | 0.9535 | 5.8693 | 15.88 | 200 | 22.2 | 9.99 | 73–75 | 5 | 99.9 | 0.064 |
| 21(e) | 0.9365 | 0 | 15.88 | 200 | 0 | 0 | 73–75 | 5 | 66.7 | 0.24 |
| 21(f) | 1.1036 | 1.2460 | 18.38 | 200 | 4.1 | 1.99 | 73–75 | 6 | 100.0 | 0.090 |
| 21(g) | 1.0584 | 1.7822 | 17.62 | 200 | 6.1 | 2.95 | 73–75 | 6 | 100.3 | 0.093 |
| 21(h) | 0.4999 | 0.2949 | 17.65 | 424 | 2.1 | 0.50 | 75 | 5 | 88.6 | 0.082 |
| 21(i) | 0.2000 | 0.1265 | 17.47 | 1048 | 2.3 | 0.22 | 75 | 5 | 82.1 | 0.13 |

The relation between the acetic acid concentration and the ratio of recovery of cobalt in the above results is plotted in the figure. In such figure the relationship is shown between the concentration of acid in the system in mole percent and the recovery of cobalt. It can be seen mother liquor is the liquid remaining after the removal of of terephthalic acid from the reaction mixture obtained by oxidation of p-xylene with molecular oxygen in the presence of acetic acid and cobalt acetate.

4. The method according to claim 2, in which the mother liquor is the liquid remaining after the removal of terephthalic acid from the reaction mixture obtained by oxidation of p-xylene with molecular oxygen in the presence of an aqueous solution of acetic acid having a water content of no more than 30 mole percent and cobalt acetate.

5. The method according to claim 1, in which the aqueous solution of a lower aliphatic monocarboxylic acid of 2-4 carbons contains the monocarboxylic acid and water at such a concentration that in the same
   (a) no less than 3 moles of the aliphatic monocarboxylic acid, and not less than 4 moles of water, per gram-atom of cobalt are present, and
   (b) the concentration of the aliphatic monocarboxylic acid in the total aqueous solution present in the system is no less than 0.5 mole percent and no more than 60 mole percent.

6. The method according to claim 1, in which the heating temperature ranges from 100 to 200° C.

7. The method according to claim 1, in which the hydrocarbon is selected from the group consisting of toluene, m-xylene, p-xylene, p-cymene and cyclohexane.

8. The method according to claim 1, in which the oxidized derivative of hydrocarbon is selected from the group consisting of p-tolualdehyde, m-tolualdehyde, p-toluic acid, m-toluic acid, methyl-p-toluylate, methyl-m-toluylate, cyclohexanol and cyclohexanone.

9. A method of refining and recovering a cobalt salt catalyst of lower aliphatic monocarboxylic acids of 2-4 carbon atoms used for the oxidation of hydrocarbons or their oxidized derivatives with molecular oxygen, said oxidation being carried out in the presence of a trivalent form of said cobalt salt in the absence of bromine, which comprises heating said used cobalt salt catalyst to a temperature ranging from 50 to 300° C. in the presence of an aqueous solution of a lower aliphatic monocarboxylic acid of 2-4 carbon atoms in which
   (a) not less than 2 moles of the aliphatic monocarboxylic acid, and not less than 4 moles of water, per gram-atom of the cobalt are present, and
   (b) the concentration of the aliphatic monocarboxylic acid in the total aqueous solution present in the system is not less than 0.2 mole percent and not more than 80 mole percent,
so as to recover the cobalt salt catalyst dissolved in the aqueous solution of the aliphatic monocarboxylic acid.

References Cited

UNITED STATES PATENTS 2,964,559   12/1960   Burney _____ 260—525

TOBIAS E. LEVOW, Primary Examiner

A. P. DEMERS, Assistant Examiner

U.S. Cl. X.R.

252—412; 260—523, 524, 525